United States Patent
Matsubaguchi et al.

(10) Patent No.: US 6,815,055 B2
(45) Date of Patent: Nov. 9, 2004

(54) MAGNETIC RECORDING MEDIUM

(75) Inventors: Satoshi Matsubaguchi, Kanagawa (JP); Yuichiro Murayama, Kanagawa (JP); Nobuyoshi Asada, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 112 days.

(21) Appl. No.: 10/196,418

(22) Filed: Jul. 17, 2002

(65) Prior Publication Data

US 2003/0108773 A1 Jun. 12, 2003

(30) Foreign Application Priority Data

Jul. 17, 2001 (JP) ..................................... P.2001-216757

(51) Int. Cl.$^7$ ................................................. G11B 5/71
(52) U.S. Cl. ............... 428/336; 428/425.9; 428/694 BP
(58) Field of Search ........................... 428/33 C, 425.9, 428/694 BP

(56) References Cited

U.S. PATENT DOCUMENTS 6,221,468 B1 * 4/2001 Murayama et al. ......... 428/215
6,224,967 B1 * 5/2001 Murayama et al. ......... 428/216

FOREIGN PATENT DOCUMENTS

JP 11-039639 * 2/1999

* cited by examiner

*Primary Examiner*—Stevan A. Resan
(74) *Attorney, Agent, or Firm*—Sughrue Mion, PLLC

(57) ABSTRACT

A magnetic recording medium is disclosed, comprising a support having thereon a lower layer containing a nonmagnetic powder or a ferromagnetic powder dispersed in a binder, and at least a magnetic layer containing a ferromagnetic powder dispersed in a binder provided on the lower layer, wherein the binder contains a polyurethane resin obtained from a polyester polyol comprising a specific diol, a chain extending agent and an organic diisocyanate, and the magnetic layer surface has a C/Fe peak ratio of from 7 to 11.

3 Claims, No Drawings

MAGNETIC RECORDING MEDIUM

FIELD OF THE INVENTION

The present invention relates to a magnetic recording medium comprising a support having provided thereon a magnetic layer containing a ferromagnetic powder dispersed in a binder.

BACKGROUND OF THE INVENTION

The magnetic recording medium is widely used as a recording tape, a video tape and a floppy disc. The magnetic recording medium comprises a support having laminating thereon a magnetic layer containing a ferromagnetic powder dispersed in a binder.

The magnetic recording medium is required to have various characteristics, e.g., electromagnetic characteristics, running durability and running performance in a high level. That is, the audio tape for recording and reproducing music is required to have higher reproducing performance of the original sound. Further, the video tape is required to have excellent electromagnetic characteristics, such as excellent reproducing performance of the original image. The magnetic recording medium is required to have such excellent electromagnetic characteristics and, at the same time, good running durability as described above. As an approach for obtaining good running durability, a method of improving the dispersing property of a binder is innovated.

JP-A-11-39639 (the term "JP-A" as used herein means an "unexamined published Japanese patent application") (hereinafter referred to as "Literature A") discloses a polyester polyurethane comprising an aliphatic dibasic acid and a polyester polyol comprising a specific branched aliphatic diol, and Literature A further discloses that the improvement of the dispersion stability of a magnetic powder, the improvement of output, the prevention of contamination of a head, the inhibition of increment of dropout (DO), and the improvement of long-term storage stability of the magnetic recording medium (the improvement of the $\mu$ value (friction coefficient) after one week at 60° C. under dry condition) can be ensured by using the polyester polyurethane.

Literature A has been filed by the present inventors, which is characterized in that a polyurethane having high strength and high dispersing property is used as the binder, however, there is a problem that sufficient performance cannot be shown when the magnetic recording medium is stored for a long period of time under high temperature high humidity conditions.

In particular, when a tape is stored for a long term under high temperature high humidity conditions, there is a case where the decomposition of the materials in the tape due to a hydrochloric acid gas and the like takes place, e.g., a fatty acid which is generated due to the hydrolysis of an ester-based lubricant migrates to the surface of the magnetic layer and precipitates and crystallizes. Since the tape has been improved in recording density, even a minute impurity greatly affects the performance of the magnetic recording medium.

SUMMARY OF THE INVENTION

The object of the present invention is to provide the following magnetic recording media.

(1) A magnetic recording medium having excellent dispersing property, smoothness of the coated film and excellent electro-magnetic characteristics.

(2) A magnetic recording medium which is excellent in long-term storage stability.

The above object of the present invention has been attained by a magnetic recording medium comprising a support having thereon a lower layer containing a nonmagnetic powder or a ferromagnetic powder dispersed in a binder, and at least a magnetic layer containing a ferromagnetic powder dispersed in a binder provided on the lower layer, wherein the binder contains a polyurethane resin obtained from a polyester polyol, a chain extending agent and an organic diisocyanate, and the magnetic layer surface has a C/Fe peak ratio of from 7 to 11 when measured by the Auger electron spectroscopy, wherein the polyurethane is at least one of (1) a polyurethane wherein the dibasic acid in the polyester polyol comprises an aliphatic dibasic acid, and 70 mol % or more of the diol component comprises a diol having alkyl branched side chain having 2 or more carbon atoms and not having a cyclic structure, and (2) a polyurethane wherein the dibasic acid in the polyester polyol comprises an aliphatic dibasic acid, 70 mol % or more of the diol component comprises an alkyl branched aliphatic diol having 2 or more of the total carbon atoms of branched side chain in one molecule, and the chain extending agent comprises an alkyl branched aliphatic diol having 3 or more of the total carbon atoms of branched side chain in one molecule.

The preferred embodiments of the present invention are as follows.

(1) The magnetic recording medium is characterized in that the magnetic layer and/or the lower layer contain(s) an ester-based lubricant.

(2) The magnetic recording medium is characterized in that the magnetic layer has a thickness of preferably from 0.1 to 0.5 $\mu$m, more preferably from 0.1 to 0.3 $\mu$m.

(3) The magnetic recording medium is characterized in that the ester-based lubricant has a melting point of 10° C. or less.

DETAILED DESCRIPTION OF THE INVENTION

The magnetic recording medium according to the present invention has a magnetic layer containing a specific binder and having surface smoothness.

The binder for use in the present invention contains at least a polyurethane resin having a specific structure (hereinafter referred to as "the polyurethane resin according to the present invention").

A drawback that a relatively low molecular weight and soft component is liable to precipitate on the film surface when the magnetic recording medium is stored under high temperature high humidity conditions can be improved by using the polyurethane resin according to the present invention and the solubility in a solvent is also improved. As a result, the magnetic layer can have a higher concentration of urethane group than the usual while maintaining high dispersing property, consequently a high Tg and high durability can be ensured, by which the increment of the friction coefficient can be restrained even when the magnetic recording medium is stored under high temperature.

The magnetic layer surface in the present invention has a C (carbon)/Fe (iron) peak ratio of from 7 to 11 when measured by the Auger electron spectroscopy.

The measuring condition of the C/Fe peak ratio by the Auger electron spectroscopy is as follows.

Apparatus: Model PHI-660 manufactured by Φ Co.
Measuring condition:

Primary electron beam accelerating voltage: 3 KV
Electric current of sample: 130 nA
Magnification: 250-fold
Inclination angle: 30°

The value of C/Fe peak ratio is obtained as the C/Fe ratio by integrating the region of kinetic energy of 130 eV to 730 eV three times under the above conditions and finding the strengths of KLL peak of the carbon and LMM peak of the iron as differentials.

By restricting the C/Fe peak ratio 7 or higher, good lubricating performance of the surface can be exhibited and the durability to running of a magnetic head can be improved. Further, by restricting the C/Fe peak ratio to 11 or lower, the hydrolysis of ester-based lubricant can be restrained and the generating amount of a fatty acid is reduced, as a result, the amount of the lubricant which migrates to the surface of the magnetic layer and precipitates and crystallizes is reduced, thus the preservability can be improved.

That is, the preservability and the electromagnetic characteristics of the magnetic recording medium can be improved by using the polyurethane resin according to the present invention and restricting the C/Fe peak ratio to the range of from 7 to 11.

The C/Fe peak ratio can be restricted to the range of the present invention by selecting the kinds and the amounts of the lubricants, surfactants and the like, and the ratio of combined use when they are used in a plurality.

The examples of the lubricants which can be preferably used in the present invention include silicone oils such as dialkoxypolysiloxane (the alkoxy group has from 1 to 4 carbon atoms), and monoalkylmonoalkoxypolysiloxane (the alkyl group has from 1 to 5 carbon atoms and the alkoxy group has from 1 to 4 carbon atoms); fatty acid esters comprising a monobasic fatty acid having from 12 to 20 carbon atoms and a monovalent or polyvalent alcohol having from 3 to 12 carbon atoms, alkylphosphoric acid esters, saturated fatty acids having from 10 to 22 carbon atoms, unsaturated fatty acids, and fatty acid amides.

Of the above, fatty acid esters are preferably used. The examples of raw material alcohols of fatty acid esters include monoalcohols such as ethanol, butanol, phenol, benzyl alcohol, 2-methylbutyl alcohol, 2-hexyldecyl alcohol, propylene glycol monobutyl ether, ethylene glycol monobutyl ether, dipropylene glycol monobutyl ether, diethylene glycol monobutyl ether, and sec-butyl alcohol, and polyhydric alcohols such as ethylene glycol, diethylene glycol, neopentyl glycol, glycerin, and sorbitan derivatives. The examples of raw material fatty acids of fatty acid esters include aliphatic carboxylic acids such as acetic acid, propionic acid, octanoic acid, 2-ethylhexanoic acid, lauric acid, myristic acid, stearic acid, palmitic acid, behenic acid, arachic acid, oleic acid, linoleic acid, linolenic acid, elaidic acid, and palmitoleic acid, and mixture of these acids. The specific examples of fatty acid esters include various ester compounds, e.g., butyl stearate, sec-butyl stearate, isopropyl stearate, butyl oleate, amyl stearate, 3-methylbutyl stearate, 2-ethylhexyl stearate, 2-hexyldecyl stearate, butyl palmitate, 2-ethylhexyl myristate, a mixture of butyl stearate and butyl palmitate, butoxyethyl stearate, 2-butoxy-1-propyl stearate, products obtained by esterifying dipropylene glycol monobutyl ether with stearic acid, diethylene glycol dipalmitate, diols obtained by acylating hexamethylene diol with myristic acid, and glycerin oleate.

It is preferred in the present invention to use ester-based lubricants, e.g., a fatty acid ester, in the magnetic layer and/or the lower layer.

The layer constitution of the magnetic recording medium according to the present invention is described below. The layer constitution of the magnetic recording medium according to the present invention is not particularly restricted so long as a magnetic layer is provided on a lower layer. A lower layer is composed of a nonmagnetic powder or a ferromagnetic powder dispersed in a binder. When a nonmagnetic powder is selected as the main component, a nonmagnetic layer can constitute a lower layer, and when a magnetic powder is selected as the main component, a magnetic layer can constitute a lower layer. When a lower layer is a nonmagnetic layer, the lower layer is called a lower nonmagnetic layer, and when a lower layer is a magnetic layer, the lower layer is called a lower magnetic layer, but when both layers are called collectively, they are also called merely a lower layer. Further, a lower layer and a magnetic layer provided on a lower layer (an upper magnetic layer) may be a single layer or multilayer.

It is preferred in the present invention to use, in particular, a fatty acid ester having a melting point of 10° C. or less, more preferably from 1 to 7° C., as the ester-based lubricant in the magnetic layer and/or the lower layer.

As the examples of the fatty acid esters having a melting point of 10° C. or less, 2-ethylhexyl stearate, isohexadecyl stearate, oleyl oleate and neopentyl glycol didecanoate can be exemplified.

Fatty acid esters which hardly hydrolyze can be used by selecting branched/straight chain derived from the fatty acids and alcohols of fatty acid ester materials, isomeric structure such as cis/trans, and the position of branching.

Further, as the composition of a lubricant, it is more preferred to use a fatty acid ester, a fatty acid and a fatty acid amide in combination. As fatty acids, e.g., saturated fatty acids (having from 10 to 22 carbon atoms) which are solids at an ordinary temperature can be exemplified, and as fatty acid amides, fatty acid amides having from 8 to 22 carbon atoms, e.g., stearic acid amide, can be exemplified.

These lubricants are added in an amount of from 1 to 30 mass parts (i.e., weight parts) in total per 100 mass parts of the binder. In particular, fatty acid esters are used generally in an amount of from 0.5 to 3.0 mass parts (i.e., weight parts), preferably from 0.7 to 2.5 mass parts, per 100 mass parts of the ferromagnetic powder (the upper magnetic layer or the lower magnetic layer) or the nonmagnetic powder (the powder of the main component in the lower nonmagnetic layer), fatty acids are used generally in an amount of from 0.1 to 2.0 mass parts, preferably from 0.3 to 1.5 mass parts, per 100 mass parts of the ferromagnetic powder (the upper magnetic layer or the lower magnetic layer) or the nonmagnetic powder (the powder of the main component in the lower nonmagnetic layer), and fatty acid amides are used generally in an amount of from 0.1 to 2.0 mass parts, preferably from 0.2 to 1.0 mass parts, per 100 mass parts of the ferromagnetic powder (the upper magnetic layer or the lower magnetic layer) or the nonmagnetic powder (the powder of the main component in the lower nonmagnetic layer). These lubricants are preferably added to each of the lower layer and the magnetic layer, and it is effective to arbitrarily change the amount to be added to each layer so as to adjust the amount of each lubricant bleeding to the surface of the magnetic layer.

The polyurethane resin according to the present invention is obtained from a polyester polyol, a chain extending agent and an organic diisocyanate.

The polyester polyol contains as the constituents (1) an aliphatic dibasic acid and a diol, wherein 70 mol % or more of the diol component comprises a diol having alkyl branched side chain having 2 or more carbon atoms and not having a cyclic structure, or (2) an aliphatic dibasic acid and a diol, wherein 70 mol % or more of the diol component comprises an alkyl branched aliphatic diol having 2 or more of the total carbon atoms of branched side chain in one molecule.

A polyurethane resin at least comprising the above polyester polyol (1) is called polyurethane resin (1), and a polyurethane resin comprising the above polyester polyol (2) and a chain extending agent comprising an alkyl branched aliphatic diol having 3 or more of the total carbon atoms of branched side chain in one molecule is called polyurethane resin (2).

The polyurethane resin according to the present invention comprises polyurethane resin (1) and/or polyurethane resin (2).

The diol having alkyl branched side chain having 2 or more carbon atoms and not having a cyclic structure in the above polyester polyol component (1) is also referred to as diol A.

It is necessary that diol A has at least one alkyl branched side chain having 2 or more carbon atoms, but may have a methyl group, further, other groups, e.g., a halogen atom, an alkoxyl group, etc. The alkyl branched side chain preferably has from 2 to 4 carbon atoms, and diol A preferably has 1 or 2 alkyl branched side chains. The principal chain of diol A preferably has from 3 to 6 carbon atoms. Diol A is contained in the diol component in the polyester polyol in a proportion of 70 mol % or more, preferably from 80 to 100 mol %. As the diol components other than diol A, e.g., a straight chain diol having from 2 to 9 carbon atoms and a cyclic diol having from 6 to 24 carbon atoms can be exemplified.

The alkyl branched aliphatic diol having 2 or more of the total carbon atoms of branched side chain in one molecule in the above polyester polyol component (2) is also referred to as diol B.

It is necessary that diol B has 2 or more of the total carbon atoms of alkyl branched side chain, but diol B does not always completely exclude all the groups other than alkyl branched side chain, and may contain, if necessary, groups having a cyclic structure, e.g., an alicyclic group, and further, other groups, e.g., a halogen atom, an alkoxyl group, etc. As the alkyl branched side chain, a methyl group is preferably exemplified. Diol B preferably has 2 or 3 methyl groups. The principal chain of diol B preferably has from 3 to 6 carbon atoms. Diol B is contained in the diol component in the polyester polyol in proportion of 70 mol % or more, preferably from 80 to 100 mol %. As the diol components other than diol B, e.g., a straight chain diol having from 2 to 9 carbon atoms and a cyclic diol having from 6 to 24 carbon atoms can be exemplified.

The alkyl branched aliphatic diol having 3 or more of the total carbon atoms of branched side chain in one molecule which is used as the chain extending agent in polyurethane resin (2) is also referred to as diol C.

It is necessary that diol C has 3 or more of the total carbon atoms of alkyl branched side chain, but diol C does not always completely exclude all the groups other than alkyl branched side chain, and may contain, if necessary, groups having a cyclic structure, e.g., an alicyclic group, and further, other groups, e.g., a halogen atom, an alkoxyl group, etc., similarly to diol B. As the alkyl branched side chain, an ethyl group, a propyl group and a butyl group are preferably exemplified. Diol C preferably has 2 or 3 these groups. The principal chain of diol C preferably has from 3 to 6 carbon atoms.

The examples of diol A or diol B which can be used in the present invention include 2,2-dimethyl-1,3-propanediol, 3,3-dimethyl-1,5-pentanediol, 2-methyl-2-ethyl-1,3-propanediol, 3-methyl-3-ethyl-1,5-pentanediol, 2-methyl-2-propyl-1,3-propanediol, 3-methyl-3-propyl-1,5-pentanediol, 2-methyl-2-butyl-1,3-propanediol, 3-methyl-3-butyl-1,5-pentanediol, 2,2-diethyl-1,3-propanediol, 3,3-diethyl-1,5-pentanediol, 2-ethyl-2-butyl-1,3-propanediol, 3-ethyl-3-butyl-,1,5-pentanediol, 2-ethyl-2-propyl-1,3-propanediol, 3-ethyl-3-propyl-1,5-pentanediol, 2,2-dibutyl-1,3-propanediol, 3,3-dibutyl-1,5-pentanediol, 2,2-dipropyl-1,3-propanediol, 3,3-dipropyl-1,5-pentanediol, 2-butyl-2-propyl-1,3-propanediol, 3-butyl-3-propyl-1,5-pentanediol, 2-ethyl-1,3-propanediol, 2-propyl-1,3-propanediol, 2-butyl-1,3-propanediol, 3-ethyl-1,5-pentanediol, 3-propyl-1,5-pentanediol, 3-butyl-1,5-pentanediol, 3-octyl-1,5-pentanediol, 3-myristyl-1,5-pentanediol, 3-stearyl-1,5-pentanediol, 2-ethyl-1,6-hexanediol, 2-propyl-1,6-hexanediol, 2-butyl-1,6-hexanediol, 5-ethyl-1,9-nonanediol, 5-propyl-1,9-nonanediol, and 5-butyl-1,9-nonanediol.

Of these, particularly preferred diol A are 2-ethyl-1,3-hexanediol, 2-butyl-1,3-propanediol and 2,2-diethyl-1,3-propanediol.

As preferred diol B, 2,2-dimethyl-1,3-propanediol and 3,3-dimethyl-1,5-pentanediol can be exemplified.

The examples of diol C include 2-methyl-2-ethyl-1,3-propanediol, 3-methyl-3-ethyl-1,5-pentanediol, 2-methyl-2-propyl-1,3-propanediol, 3-methyl-3-propyl-1,5-pentanediol, 2-methyl-2-butyl-1,3-propanediol, 3-methyl-3-butyl-1,5-pentanediol, 2,2-diethyl-1,3-propanediol, 3,3-diethyl-1,5-pentanediol, 2-ethyl-2-butyl-1,3-propanediol, 3-ethyl-3-butyl-1,5-pentanediol, 2-ethyl-2-propyl-1,3-propanediol, 3-ethyl-3-propyl-1,5-pentanediol, 2,2-dibutyl-1,3-propanediol, 3,3-dibutyl-1,5-pentanediol, 2,2-dipropyl-1,3-propanediol, 3,3-dipropyl-1,5-pentanediol, 2-butyl-2-propyl-1,3-propanediol, 3-butyl-3-propyl-1,5-pentanediol, 2-ethyl-1,3-propanediol, 2-propyl-1,3-propanediol, 3-propyl-1,5-pentanediol, 3-butyl-1,5-pentanediol, 3-octyl-1,5-pentanediol, 3-myristyl-1,5-pentanediol, 3-stearyl-1,5-pentanediol, 2-ethyl-1,6-hexanediol, 2-propyl-1,6-hexanediol, 2-butyl-1,6-hexanediol, 5-propyl-1,9-nonanediol, and 5-butyl-1,9-nonanediol. Of these, 2-ethyl-2-butyl-1,3-propanediol and 2,2-diethyl-1,3-propanediol are preferred.

Aliphatic dibasic acids which can be used in the polyester polyol which is the component of the polyurethane resin according to the present invention preferably have from 4 to 10 carbon atoms. The aliphatic group of the aliphatic dibasic acid means an aliphatic group having a chain structure, and a hetero atom, e.g., an oxygen atom and a sulfur atom, may be contained in the principal chain. The specific examples of the aliphatic dibasic acids include a succinic acid, an adipic acid, an azelaic acid, a sebacic acid, a malonic acid, a glutaric acid, a pimelic acid and a suberic acid. Of these, a succinic acid, an adipic acid and a sebacic acid are preferred.

The aliphatic dibasic acid is contained in the dibasic acid component in the polyester polyol in a proportion of preferably 70 mol % or more, more preferably from 80 to 100 mol %. When the content is less than 70 mol %, since a dibasic acid component having a cyclic structure such as an aromatic dibasic acid substantially increases, the solubility in a solvent lowers, thus the dispersing property is liable to lower.

The organic diisocyanate which is the constitutional component of the polyurethane resin according to the present invention is described below. The examples of the organic diisocyanate include aromatic diisocyanate, e.g., 2,4-tolylene diisocyanate, 2,6-tolylene diisocyanate, xylylene-1,4-diisocyanate, xylylene-1,3-diisocyanate, 4,4'-diphenylmethane diisocyanate, 4,4-diphenyl ether diisocyanate, 2-nitrodiphenyl-4,4'-diisocyanate, 2,2'-diphenylpropane-4,4'-diisocyanate, 4,4'-diphenylpropane diisocyanate, m-phenylene diisocyanate, p-phenylene diisocyanate, naphthylene-1,4-diisocyanate, naphthylene-1,5-diisocyanate, and 3,3'-dimethoxy-diphenyl-4,4'-diisocyanate, aliphatic diisocyanate, e.g., tetramethylene diisocyanate, hexamethylene diisocyanate, and lysine diisocyanate, and alicyclic diisocyanate, e.g., isophorone diisocyanate, hydrogenated tolylene diisocyanate, and hydrogenated diphenylmethane diisocyanate. Of these, aromatic diisocyanate is preferred and 4,4-diphenylmethane diisocyanate, 2,2-tolylene diisocyanate, p-phenylene diisocyanate, and isophorone diisocyanate are more preferred.

The polyurethane has a mass average molecular weight (Mw) of preferably from 30,000 to 70,000, more preferably from 40,000 to 60,000. When the mass average molecular weight is less than 30,000, film strength and durability are reduced. While when it is more than 70,000, the solubility into a solvent lowers and the dispersing property is reduced.

The polyurethane has a glass transition temperature (Tg) of preferably from 50 to 150° C., more preferably from 70 to 120° C., and still more preferably from 80 to 100° C. When Tg is less than 50° C., the film strength at high temperature lowers, as a result, durability and storage stability are reduced. While when Tg is higher than 150° C., calendering moldability lowers, which causes the reduction of electromagnetic characteristics.

It is preferred that the polyurethane resin according to the present invention has a polar group. As the polar groups, those selected from the following are used, e.g., $-SO_3M$, $-OSO_3M$, $-COOM$, $-P=O(OM)_2$, $-O-P=O(OM)_2$, $-NR_2$, $-N^+R_2R'COO^-$ (wherein M represents a hydrogen atom, an alkali metal or ammonium, and R and R' each represents an alkyl group having from 1 to 12 carbon atoms).

The polar group may be added to the diol component or dibasic acid component for use in the polyurethane resin according to the present invention, or may be added to a polyol other than the polyester polyol according to the present invention and then the polyurethane resin according to the present invention may be formed by polymerizing the monomer, or the polar group may be added to the resin having been formed.

As the polyol component, polyester polyols, polyether polyols, polyether ester polyols, and polycarbonate polyols can be used in combination.

As the monomers having the above polar groups, sodium 5-sulfoisophthalate, potassium 5-isophthalate, sodium sulfoterephthalate, potassium terephthalate, sodium 2-sulfo-1,4-butanediol, potassium 2-sulfo-1,4-butanediol, sodium bis(2-hydroxyethyl)phosphinate, dimethylolpropionic acid, sodium dimethylolpropionate, sodium sulfosuccinate, polar group-containing polyester polyols obtained by dehydration condensation with other glycol or dicarboxylic acid, polar group-containing polyester polyols obtained by ring-opening polymerization of lactone, e.g., ε-caprolactone, with the above polar group-containing diol as the polymerization initiator, and polar group-containing polyether diols obtained by the addition of alkylene oxide, e.g., ethylene oxide or propylene oxide, to polar group-containing diol are specifically exemplified.

As the polar group for use in the polyurethane resin according to the present invention, $-SO_3M$, $-OSO_3M$, $-P=O(OM)_2$ and $-COOM$ are preferred, $-SO_3M$ and $-OSO_3M$ are more preferred. The content of polar groups is preferably from $1\times10^{-5}$ eq/g to $2\times10^{-4}$ eq/g, when the content is less than $1\times10^{-5}$ eq/g, the adsorption onto magnetic powders becomes insufficient, as a result, a dispersing property is liable to lower, while when it is larger than $2\times10^{-4}$ eq/g, the solubility in a solvent lowers, as a result, a dispersing property is liable to lower.

The concentration of the urethane group in the polyurethane resin according to the present invention is preferably from 3.0 to 4.0 mmol/g, more preferably from 3.3 to 3.7 mmol/g. When the concentration is less than 3.0 mmol/g, the glass transition temperature (Tg) of the coated film lowers and durability lowers, while when it is larger than 4.0 mmol/g, the solubility in a solvent lowers, a dispersing property lowers as well, as a result, since the polyurethane resin cannot contain a polyol inevitably, synthetical disadvantages are liable to be generated such that it is difficult to adjust the molecular weight, etc.

The content of OH groups in the polyurethane resin according to the present invention is preferably from 3 to 20 per a molecule, more preferably from 3 to 15. When the content of OH groups per a molecule is less than 3, film strength lowers and durability lowers due to the reduction of the reactivity with an isocyanate hardening agent. On the other hand, when the content of OH groups per a molecule is more than 15 per a molecule, the solubility into a solvent lowers, leading to the reduction of a dispersing property.

The polyurethane resin according to the present invention is added to the lower layer and the magnetic layer as a binder component. The binder for use in the lower layer and the magnetic layer may be the polyurethane resin according to the present invention alone, or may be used in combination with other resins. The polyurethane resin according to the present invention is a composition which generally contains a hardening agent such as polyisocyanate.

As the resins to be used in combination with the polyurethane resin according to the present invention, vinyl chloride resins are exemplified. The degree of polymerization of the vinyl chloride resins is preferably from 100 to 500, more preferably from 150 to 400, and particularly preferably from 200 to 300. The vinyl chloride resins may be those obtained by polymerization of vinyl monomers, e.g., a vinyl acetate, a vinyl alcohol, a vinylidene chloride or an acrylonitrile.

Of the vinyl chloride resins, a copolymer containing a vinyl chloride and a vinyl acetate is preferred. A vinyl acetate is preferably contained in the copolymer in proportion of from 1 to 15 mass %, by which the compatibility with the polyurethane resin according to the present invention becomes high and the viscosity in a coating solution at high rate of shear becomes low, as a result, a markedly smooth magnetic layer can be obtained.

It is preferred that the vinyl chloride resins have the similar polar groups to those contained in the polyurethane resin according to the present invention, and the content of the polar groups is preferably from $1\times10^{-5}$ to $1\times10^{-3}$ eq/g. When the content is higher than this range, viscosity increases and a dispersing property is liable to lower. When the content is lower than this range, a dispersing property is also liable to lower.

It is preferred for the vinyl chloride resins to contain an epoxy group. The content of the epoxy group is preferably from $1\times10^{-4}$ to $1\times10^{-2}$ eq/g, more preferably from $5\times10^{-4}$ to $2\times10^{-3}$ eq/g.

Further, it is preferred that the vinyl chloride resins have OH groups. When OH groups are contained in the vinyl chloride resins, the OH groups react with an isocyanate hardening agent to form a crosslinking structure, as a result, mechanical strength is preferably heightened. For introducing the OH groups into the vinyl chloride resins, the bonding through a hydrocarbon chain or a polyalkylene glycol chain from the principal chain is preferred for capable of obtaining higher hardening property as compared with the bonding direct to the polymer principal chain such as a vinyl alcohol. The OH groups are preferably primary and secondary OH groups. The introduction of the OH groups into the vinyl chloride resins can be performed by copolymerization of vinyl monomers, such as 2-hydroxypropyl (meth)acrylate, 3-hydroxypropyl (meth)acrylate, 4-hydroxybutyl (meth) acrylate, and 4-hydroxybutylallyl ether.

The content of the OH groups in the vinyl chloride resins is preferably from $1 \times 10^{-4}$ to $5 \times 10^{-3}$ eq/g, more preferably from $2 \times 10^{-4}$ to $2 \times 10^{-3}$ eq/g.

The vinyl chloride resins can generally contain other copolymerizable monomers in a proportion of from 0 to 15 mass % (i.e., weight %). The examples of the copolymerizable monomers include alkyl (meth)acrylate, vinyl carboxylate, allyl ether, styrene, glycidyl (meth)acrylate, 3-hydroxypropyl methacrylate, 2-hydroxypropyl methacrylate, 3-hydroxypropylallyl ether, and other vinyl monomers.

The binder components which can be used in combination in the present invention other than the above include cellulose derivatives, e.g., nitrocellulose, acrylate resins, polyvinyl acetal resins, polyvinyl butyral resins, epoxy resins and phenoxy resins, and these compounds can be used alone or in combination.

In general, the polyurethane resin according to the present invention is preferably contained in the binder in an amount of from 50 to 100 mass % (i.e., weight %), more preferably from 70 to 100 mass %, and particularly preferably from 80 to 100 mass %. When the amount is less than 50 mass %, a dispersing property lowers.

It is preferred that the above resins which can be used in combination have a polar group, and the kind and the amount of the polar groups are the same as those in the polyurethane resin according to the present invention unless otherwise indicated.

When the polyurethane resin according to the present invention are used in combination with vinyl chloride resins, the resins having the proportion (by mass (i.e., by weight)) of the polyurethane resin according to the present invention to the polar group-containing vinyl chloride resin of preferably from 85/15 to 100/0, more preferably from 90/10 to 100/0, and particularly preferably from 95/5 to 100/0 are exemplified as the binder.

The hardening agents which are used as the binder component include a polyisocyanate hardening agent and an epoxy hardening agent, and a polyisocyanate hardening agent is preferred. The examples of polyisocyanate hardening agents include the above organic diisocyanate compounds which are the constitutional components of the polyurethane resin according to the present invention, and the reaction products of the above diisocyanates and polyhydric alcohols, such as trimethylolpropane and glycerol, e.g., the reaction product of 3 mols of tolylenediisocyanate and 1 mol of trimethylolpropane (e.g., Desmodur L-75 manufactured by Bayer Co., Ltd.), the reaction product of 3 mols of xylylenediisocyanate or hexamethylenediisocyanate and 1 mol of trimethylolpropane, and the biuret addition compounds of 3 mols of hexamethylenediisocyanate. As the isocyanurate type polyisocyanate obtained by polymerization of a diisocyanate compound, the trimers, pentamers and heptamers of tolylenediisocyanate and hexamethylenediisocyanate are exemplified. Polymeric MDI which is the polymer of MDI (4,4-diphenylmethanediisocyanate) is also exemplified. These polyisocyanate compounds to be contained in the magnetic layer are preferably added to the binder in a proportion of from 10 to 50 mass %, more preferably from 20 to 40 mass %.

When hardening treatment is performed by electron beam irradiation, compounds having a reactive double bond, such as urethane acrylate, can be used. The mass (i.e. weight) of the resin component and the hardening agent in total (i.e., a binder) is generally preferably from 15 to 40 mass parts, more preferably from 20 to 30 mass parts (i.e., weight parts), per 100 mass parts of the ferromagnetic powder.

The chlorine content in the magnetic recording medium according to the present invention is preferably 35 mg or less per m² of the magnetic recording medium, more preferably 20 mg or less, and particularly preferably the content can be made 10 mg or less.

The ferromagnetic powders which can be used in the magnetic recording medium according to the present invention are a ferromagnetic iron oxide, a cobalt-containing ferromagnetic iron oxide, and a ferromagnetic alloy powder. These ferromagnetic powders have a specific surface area ($S_{BET}$) measured by the BET method of generally from 40 to 80 m²/g, preferably from 50 to 70 m²/g, a crystallite size of generally from 12 to 25 nm, preferably from 13 to 22 nm, and particularly from 14 to 20 nm.

The examples of the ferromagnetic metal powders which can be used in the present invention include Fe, Ni, Fe—Co, Fe—Ni, Co—Ni, Co—Ni—Fe, etc. The ferromagnetic metal powders containing Fe as the main component which are used for a high density recording medium are preferably used in the present invention, and generally Fe accounts for 50 atomic % or more of the ferromagnetic metal powder, preferably from 55 to 90 atomic %. Elements such as Y and Co are preferably used in combination. Since these elements can make saturation magnetization ($\sigma_s$) large and can form a minute and thin oxide film, they are particularly preferably used in the present invention. The content of an yttrium in the ferromagnetic powder is preferably in the ratio of an yttrium atom to an iron atom, Y/Fe of preferably from 0.5 to 20 atomic %, more preferably from 5 to 10 atomic %. When Y/Fe is smaller than 0.5 atomic %, $\sigma_s$ of the ferromagnetic powder cannot be made high, which results in the reduction of magnetic characteristics and electromagnetic characteristics. While when Y/Fe is larger than 20 atomic %, the content of the iron lessens, as a result, magnetic characteristics lowers and electromagnetic characteristics lowers. Further, the ferromagnetic metal powder can contain the following in a proportion of 20 atomic % or less in total, preferably from 7 to 20 atomic % in total, per 100 atomic % of iron: aluminum, silicon, sulfur, scandium, titanium, vanadium, chromium, manganese, copper, zinc, molybdenum, rhodium, palladium, gold, tin, antimony, boron, barium, tantalum, tungsten, rhenium, silver, lead, phosphorus, lanthanum, cerium, praseodymium, neodymium, tellurium, and bismuth.

Although the ferromagnetic metal powders containing Y are difficult to be dispersed due to strong magnetic energy among particles, a magnetic recording medium excellent in electromagnetic characteristics and running durability can be obtained by performing dispersion with the binder containing the polyurethane resin according to the present invention.

The manufacturing method of these ferromagnetic powders are well-known and the ferromagnetic powders for use in the present invention can also be manufactured according to well-known methods. The ferromagnetic powders having an acicular shape, a granular shape, a die shape, an ellipsoidal shape and a tabular shape are used in the present invention. The ferromagnetic powder having an acicular shape is particularly preferably used.

An example of manufacturing method of a ferromagnetic metal powder containing a cobalt and an yttrium preferably used in the present invention is shown below. An example of a method of using an iron oxyhydroxide which is obtained by blowing an oxidizing gas to an aqueous suspension of the mixture of a ferrous salt and an alkali as a starting material can be exemplified. As the kind of the iron oxyhydroxide, alpha-FeOOH is preferred, which is produced, as a first method, by neutralizing a ferrous salt with an alkali hydroxide to make an aqueous suspension of $Fe(OH)_2$, and blowing an oxidizing gas to the suspension, to thereby obtain an acicular alpha-FeOOH. On the other hand, as a second method, alpha-FeOOH is produced by neutralizing a ferrous salt with an alkali carbonate to make an aqueous suspension of alpha-$FeCO_3$, and blowing an oxidizing gas to the suspension, to thereby obtain a spindle-like alpha-FeOOH. Such an iron oxyhydroxide is preferably that which is obtained by reacting an aqueous solution of ferrous salt and an aqueous solution of alkali to obtain an aqueous solution containing ferrous hydroxide, and oxidizing the above-obtained solution by air oxidation. At this time, an Ni salt, the salt of alkaline earth element, e.g., a Ca salt, a Ba salt or an Sr salt, or a Cr salt or a Zn salt may be present in the aqueous solution of ferrous salt. By selecting and using these salts arbitrarily, the shape of particles (axial ratio) can be adjusted. As the ferrous salts, a ferrous chloride and a ferrous sulfate are preferred. As the alkalis, a sodium hydroxide, an aqueous ammonia, an ammonium carbonate and a sodium carbonate are preferred. As the salts which can coexist in the aqueous solution of ferrous salt, a nickel chloride, a calcium chloride, a barium chloride, a strontium chloride, a chromium chloride and a zinc chloride are preferred.

In the next place, when a cobalt is introduced to the iron, an aqueous solution containing a cobalt compound, e.g., a cobalt sulfate or cobalt chloride, is mixed with the above slurry of iron oxyhydroxide with stirring before introducing an yttrium. After the slurry of iron oxyhydroxide containing a cobalt has been prepared, an yttrium can be introduced by adding an aqueous solution containing an yttrium compound to the above slurry and mixing and stirring. Neodymium, samarium, praseodymium and lanthanum other than yttrium can be added to the ferromagnetic powder. They can be added as a chloride, e.g., a yttrium chloride, a neodymium chloride, a samarium chloride, a praseodymium chloride, or a lanthanum chloride, and as a nitrate, e.g., a neodymium nitrate or a gadolinium nitrate. These compounds can be used in combination of two or more.

As is well known, an oxide film can be formed on the surface of the particle of a ferromagnetic metal powder by gradual oxidation treatment for chemically stabilizing the ferromagnetic metal powder. The ferromagnetic metal powder may contain a small amount of a hydroxide or an oxide. When a carbonic acid gas is contained in the gas for gradual oxidation treatment, since a carbonic acid gas is adsorbed onto the base point on the surface of the ferromagnetic metal powder, such a carbonic acid gas may be contained.

For lessening the surface roughness of the magnetic recording medium, it is preferred for the ferromagnetic metal powder to have an average long axis length of generally from 0.04 to 0.15 µm, preferably from 0.05 to 0.12 µm, and an average acicular ratio of generally from 4 to 10, preferably from 4 to 8.

When the crystal in ferromagnetic metal powder particles is observed and the rate of the particles formed as monocrystal to the entire particles is defined as the crystallinity, the crystallinity is preferably from 30 to 100%, more preferably from 35 to 100%. The saturation magnetization ($\sigma_s$) of the ferromagnetic metal powder in the present invention is preferably 100 $A \cdot m^2/kg$ or more, more preferably from 110 to 160 $A \cdot m^2/kg$. The coercive force (Hc) of the ferromagnetic metal powder is preferably from 1,800 to 3,000 Oe (143 to 239 kA/m), more preferably from 1,900 to 2,800 Oe (151 to 223 kA/m).

The ferromagnetic powder may be previously treated with the later described dispersant, lubricant, surfactant and antistatic agent before dispersion. The specific examples thereof are disclosed in JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-48-39639, U.S. Pat. Nos. 3,026,215, 3,031,341, 3,100,194, 3,242,005 and 3,389,014.

The ferromagnetic metal powder preferably has a water content of from 0.01 to 2 mass %. It is preferred to optimize the water content of the ferromagnetic metal powder by selecting the kinds of the binders described later. The tap density of the ferromagnetic metal powder is preferably from 0.2 to 0.8 g/ml. When the tap density is greater than 0.8 g/ml, uniform gradual oxidation of the ferromagnetic metal powder is difficult, and it is hard to handle the ferromagnetic metal powder, or the magnetization of the tape and the like obtained is liable to be reduced with the lapse of time. When the tap density is smaller than 0.2 g/ml, dispersion is liable to be insufficient.

A magnetic coating solution is prepared by kneading and dispersing the above resin component, hardening agent and ferromagnetic powder with a solvent usually used in the preparation of a magnetic coating solution, e.g., methyl ethyl ketone, dioxane, cyclohexanone or ethyl acetate. Kneading and dispersion can be performed according to usual methods. Further, besides the above components, usually used additives such as an abrasive, e.g., alpha-$Al_2O_3$, $Cr_2O_3$, etc., an antistatic agent, e.g., a carbon black, or a filler are generally added to the magnetic coating solution.

The nonmagnetic powder for use in the lower nonmagnetic layer can be selected from inorganic compounds, e.g., metallic oxide, metallic carbonate, metallic sulfate, metallic nitride, metallic carbide, metallic sulfide, etc. The examples of inorganic compounds are selected from the following compounds and they can be used alone or in combination, e.g., alpha-alumina having an alpha-conversion rate of from 90% to 100%, beta-alumina, gamma-alumina, silicon carbide, chromium oxide, cerium oxide, alpha-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. Of these compounds, titanium dioxide, zinc oxide, iron oxide and barium sulfate are particularly preferred, and titanium dioxide is more preferred. These nonmagnetic powders preferably have an average particle size of from 0.005 to 2 µm. If necessary, a plurality of nonmagnetic powders each having a different particle size may be combined, or a single nonmagnetic powder may have broad particle size distribution so as to attain the same effect as such a combination. The nonmagnetic powders particularly preferably have an average particle size of from 0.01 to 0.2 µm, a pH value of from 6 to 9, a specific surface area ($S_{BET}$) of from 1 to 100 m$^2$/g, preferably from 5 to 50 m$^2$/g, and more preferably from 7 to 40 m$^2$/g, a crystallite size of from 0.01 to 2 µm, an oil absorption amount using DBP of from 5 to 100 ml/100 g, preferably from 10 to 80 ml/100 g, and more preferably from 20 to 60 ml/100 g, and a specific gravity of from 1 to 12, preferably from 3 to 6. The shape of the nonmagnetic powders may be any of an acicular, spherical, polyhedral, or tabular shape. The surfaces of the nonmagnetic powders are preferably covered with $Al_2O_3$, $SiO_2$, $TiO_2$, $ZrO_2$, $SnO_2$, $Sb_2O_3$, or ZnO. $Al_2O_3$, $SiO_2$, $TiO_2$ and $ZrO_2$ are particularly preferred in the point of dispersing property, and $Al_2O_3$, $SiO_2$ and $ZrO_2$ are more preferred. They can be used in combination or may be used alone. The surface treatment may be performed by coprecipitation, alternatively, the surfaces of particles may be covered with alumina in the first place, and then the alumina-covered surface may be covered with silica, or vice versa. The surface-covering layer may be porous layer, but a homogeneous and dense surface is generally preferred.

By the addition of carbon blacks to the lower layer, a desired micro Vickers' hardness can be obtained, and surface electric resistance (Rs) can be reduced as well, as are well-known effects. Furnace blacks for rubbers, thermal blacks for rubbers, carbon blacks for coloring and acetylene blacks can be used for these purposes. The carbon blacks have a specific surface area ($S_{BET}$) of from 100 to 500 m$^2$/g, preferably from 150 to 400 m$^2$/g, a DBP oil absorption of from 20 to 400 ml/100 g, preferably from 30 to 200 ml/100 g, an average particle size of generally from 5 to 80 nm, preferably from 10 to 50 nm, and more preferably from 10 to 40 nm, a pH value of from 2 to 10, a water content of from 0.1 to 10%, and a tap density of from 0.1 to 1 g/ml. The specific examples of carbon blacks for use in the present invention include BLACKPEARLS 2000, 1300, 1000, 900, 800, 880 and 700, and VULCAN XC-72 (manufactured by Cabot Co., Ltd.), #3050B, #3150B, #3250B, #3750B, #3950B, #950, #650B, #970B, #850B and MA-600 (manufactured by Mitsubishi Kasei Corp.), CONDUCTEX SC, RAVEN 8800, 8000, 7000, 5750, 5250, 3500, 2100, 2000, 1800, 1500, 1255 and 1250 (manufactured by Columbia Carbon Co., Ltd.), and Ketjen Black EC (manufactured by Akzo Co., Ltd.).

In the case where the lower layer is a lower magnetic layer, gamma-$Fe_2O_3$, Co-modified gamma-$Fe_2O_3$, alloys comprising alpha-Fe as a main component, and $CrO_2$ are used as the ferromagnetic powders. Co-modified gamma-$Fe_2O_3$ is particularly preferred. The ferromagnetic powders for use in the lower magnetic layer are selected from the ferromagnetic powders different from the ferromagnetic powders for use in the upper magnetic layer in the composition and/or the magnetic characteristics. For example, it is preferred to set up the coercive force (Hc) of the lower magnetic layer lower than that of the upper magnetic layer for improving long wavelength recording properties, and it is possible to use a ferromagnetic iron oxide powder in the lower magnetic layer and a ferromagnetic metal powder in the upper magnetic layer. Making residual magnetic flux density (Br) of the lower magnetic layer higher than that of the upper magnetic layer is effective. The binders, lubricants, dispersants, additives, solvents and dispersing methods which are used in the production of the lower magnetic layer or the lower nonmagnetic layer can be the same as those for use in the upper magnetic layer.

Well-known supports can be used in the present invention, for example, biaxially stretched polyethylene naphthalate, polyethylene terephthalate, polyamide, polyimide, polyamideimide, aromatic polyamide, and benzoxazole can be used. Polyethylene naphthalate and aromatic polyamide are preferably used. The support may be previously subjected to surface treatments, such as corona discharge treatment, plasma treatment, easy adhesion treatment, and heat treatment. It is preferred that the supports for use in the present invention have excellent smoothness such as the central plane average surface roughness of from 0.1 to 20 nm, preferably from 1 to 10 nm, at cutoff value of 0.25 mm. It is preferred that not only the central plane average surface roughness is small but coarse protrusions of 1 µm or larger are not present on the support.

The magnetic recording medium according to the present invention is produced by coating a lower layer coating solution and an upper magnetic layer coating solution on the surface of the support under running in a dry thickness of the upper magnetic layer of preferably from 0.1 to 0.5 µm, more preferably from 0.1 to 0.3 µm, and in a dry thickness of the lower layer of preferably from 0.05 to 5 µm, more preferably from 0.07 to 3 µm. The lower layer coating solution and the upper magnetic layer coating solution may be coated successively or may be coated by simultaneous multilayer coating.

Air doctor coating, blade coating, rod coating, extrusion coating, air knife coating, squeeze coating, immersion coating, reverse roll coating, transfer roll coating, gravure coating, kiss coating, cast coating, spray coating and spin coating can be used for the above magnetic layer coating. These methods are described, e.g., in *Saishin Coating Gijutsu* (*The Latest Coating Techniques*), Sogo Gijutsu Center Co. (May 31, 1983).

As the examples of the coating apparatus and the methods for use in the production of the magnetic recording medium of the present invention, the following are supposed.

(1) The lower layer is coated in the first place by any of gravure coating, roll coating, blade coating, and extrusion coating apparatuses, which are ordinarily used in the coating of a magnetic coating solution, and the upper magnetic layer is coated while the lower layer is still wet by means of the support pressing type extrusion coating apparatus disclosed in JP-B-1-46186, JP-A-60-238179 and JP-A-2-265672.

(2) The upper magnetic layer and the lower layer are coated almost simultaneously using the coating head equipped with two slits for feeding coating solution as disclosed in JP-A-63-88080, JP-A-2-17971 and JP-A-2-265672.

(3) The upper magnetic layer and the lower layer are coated almost simultaneously using the extrusion coating apparatus equipped with a backup roll as disclosed in JP-A-2-174965.

A back coating layer (a backing layer) may be provided on the support of the side on which the magnetic coating solution is not coated. The back coating layer is a layer provided by coating a back coating layer coating solution comprising granular components such as an abrasive and an antistatic agent and a binder dispersed in an organic solvent. As the granular components, various inorganic pigments and carbon blacks can be used. As the binder, resins, e.g., nitrocellulose, a phenoxy resin, a vinyl chloride resin, and polyurethane can be used alone or as mixture. An adhesive layer may be provided on the coating surfaces of the magnetic coating solution and the back coating layer coating solution of the support.

These coating layers are dried after the ferromagnetic powders contained in the coating layers have been subjected to orientation treatment of the magnetic field. After being dried, the coating layers are subjected to surface smoothing treatment. Super calender rolls are used for surface smoothing treatment. By the surface smoothing treatment, the holes generated by the removal of a solvent by the drying vanish and the packing rate of the ferromagnetic powder in the magnetic layer is improved and the magnetic recording medium having high electromagnetic characteristics can be obtained. As the rolls for calendering treatment, heat resisting plastic rolls, e.g., epoxy, polyimide, polyamide and polyamideimide are used. Metal rolls may be used for the treatment.

It is preferred that the surface of the magnetic recording medium according to the present invention has excellent smoothness such as the center line average surface roughness of the surface of from 0.1 to 4 nm, preferably from 1 to 3 nm, at cutoff value of 0.25 mm. Such marked smoothness can be achieved by performing calendering treatment on the surface of the magnetic layer formed from the specific ferromagnetic powder and the binder. The calendering treatment is preferably performed at the temperature of the calender roll of from 60 to 100° C., preferably from 70 to 100° C., and particularly preferably from 80 to 100° C., and the pressure of generally from 100 to 500 kg/cm (from 980 to 4,900 N/cm), preferably from 200 to 450 kg/cm (from 1,960 to 4,410 N/cm), and particularly preferably from 300 to 400 kg/cm (from 2,940 to 3,920 N/cm). The laminate hardening-treated in this manner is then made to a desired shape. The obtained magnetic recording medium is cut to a desired size by a cutter and used.

As described above, since the polyurethane in the present invention contains, as the polyol components, an aliphatic dibasic acid and a branched aliphatic diol in a larger amount than before, the solubility into a solvent is high and the excellent dispersing property of the ferromagnetic powder can be obtained. Further, since the concentration of the urethane group is high, high Tg can be obtained as compared with conventional aliphatic urethane, thus the excellent running durability can be obtained.

When the concentration of the urethane group of hydrogen bonding component is increased, on one hand the film strength such as Tg is increased due to the improvement of the inter-molecular interaction in a dry film, but on the other hand, the solubility into a solvent is lowered, the viscosity of a coating solution increases, as a result, a dispersing property lowers. However, since the polyurethane in the present invention is high in the concentration of the urethane group and, at the same time, uses, as the polyol components, an aliphatic dibasic acid and a branched aliphatic diol, the solubility into a solvent does not lower. This is thought due to the fact that the association between the polyurethane molecules in the coating solution can be prevented by the branches.

Further, the binder containing the polyurethane resin according to the present invention interacts with the ester-based lubricant, which contributes to adjust the C/Fe peak ratio of the magnetic layer to 7 to 11.

EXAMPLE

The present invention will be described in detail below with reference to specific examples, but the present invention should not be construed as being limited thereto. In the examples, "part" means "mass part (i.e., weight part)" unless otherwise indicated.

Synthesis of Polyurethane Resins A, B and C (Polyurethane Resins According to the Present Invention) and D and E (Polyurethane Resins other than the Present Invention)

The polyester polyol shown in Table 1, diol of the chain extending agent and DEIS (dimethyl sulfoisophthalate) shown in Table 2 were dissolved in cyclohexanone under nitrogen gas at 60° C. in a reaction vessel replaced with a nitrogen gas in advance and equipped with a reflux condenser and a stirrer. In Table 1, the blending amount is shown by mol %. The molecular weight was obtained by the hydroxyl value. In the next place, as the catalyst, 60 ppm of di-n-dibutyltin dilaurate was added to the above solution and dissolved for 15 minutes.

Further, 4,4'-diphenylmethane diisocyanate (MDI) was added thereto in the amount shown in Table 2 and the solution was reacted by heating at 90° C. for 6 hours, thus a polyurethane solution was obtained. The weight average molecular weight and the glass transition temperature of the obtained polyurethane are shown in Table 2.

TABLE 1

| | | | Kind of Polyester Polyol | | | | |
|---|---|---|---|---|---|---|---|
| | Constitutional Component | | a | b | c | d | e |
| Dibasic Acid | Adipic acid | | 100 | 100 | 100 | 100 | 83 |
| | Sodium 5-sulfoisophthalate | | | | | | 17 |
| Diol | Branched | 2-Ethyl-2-butyl-1,6-hexanediol | 70 | | | 60 | |
| | | 2-Ethyl-2-butyl-1,3-propanediol | | 70 | | | |
| | | 2,2-Diethyl-1,3-propanediol | | | 70 | | |
| | | 3-Methyl-1,5-pentanediol | | | | | 100 |
| | Straight chain | 1,6-Hexanediol | 30 | 30 | 30 | 40 | |
| | | Molecular weight | 620 | 620 | 650 | 610 | 1,000 |

TABLE 2

| Polyurethane Resin | Polyester Polyol Kind | Polyester Polyol Amount (mol) | Chain Extending Agent Kind | Chain Extending Agent Amount (mol) | DEIS (mol) | Diisocyanate MDI (mol) | Concentration of Urethane Group (mmol/g) | Weight Average Molecular Weight | Tg (° C.) |
|---|---|---|---|---|---|---|---|---|---|
| A | a | 24 | 2-Ethyl-1,6-hexanediol | 26 | 2 | 48 | 3.1 | 41,000 | 84 |
| B | b | 23 | 2-Ethyl-2-butyl-1,3-propanediol | 27 | 2 | 48 | 3.1 | 42,000 | 72 |
| C | c | 25 | 2,2-Diethyl-1,3-propanediol | 25 | 2 | 48 | 3.0 | 39,000 | 76 |
| D | d | 24 | 2-Ethyl-1,6-hexanediol | 26 | 2 | 48 | 3.1 | 41,000 | 46 |
| E | e | 10 | 2-Ethyl-2-butyl-1,3-propanediol | 40 | 0 | 48 | 3.4 | 76,000 | 63 |

Example 1

Coating Solution for Upper Magnetic Layer

Ferromagnetic alloy powder (100 parts) (composition: Fe 89 atomic %, Co 5 atomic %, Y 6 atomic %, Hc: 2,000 Oe (159 kA/m), crystallite size: 15 nm, $S_{BET}$: 59 m$^2$/g, average long axis length: 0.12 µm, average acicular ratio: 7, σs: 150 A·m$^2$/kg) was pulverized in an open kneader for 10 minutes, then the compound obtained by adding sodium hydroxyethyl sulfonate (SO$_3$Na: 6×10$^{-5}$ eq/g, epoxy: 10$^{-3}$ eq/g, Mw: 30,000) to the copolymer of

| | |
|---|---|
| Polyurethane resin A | 10 parts (solid content) |
| Vinyl chloride resin | 1.7 parts |
| (vinyl chloride/vinyl acetate/ | |
| glycidyl methacrylate = 86/9/5) | |
| and | |
| Cyclohexanone | 60 parts | were added to the above reaction system, kneaded for 60 minutes, and then

| | |
|---|---|
| Abrasive (Al$_2$O$_3$) (average particle size: 0.3 µm) | 2 parts |
| Carbon black (average particle size: 40 nm) | 2 parts |
| Methyl ethyl ketone/toluene = 1/1 | 200 parts | were added and dispersed in a sand mill for 120 minutes. Thereto were added

| | |
|---|---|
| Polyisocyanate | 5 parts (solid content) |
| (Coronate 3041, manufactured by Nippon Polyurethane Co., Ltd.) | |
| 2-Ethylhexyl stearate | 0.5 parts |
| Stearic acid | 0.5 parts |
| Stearic acid amide | 0.3 parts |
| Methyl ethyl ketone | 50 parts | followed by stirring and mixing for further 20 minutes, and the mixture was filtered through a filter having an average pore diameter of 1 µm, thereby a coating solution for the upper magnetic layer was obtained.

Coating Solution for Lower Nonmagnetic Layer

| | |
|---|---|
| alpha-Fe$_2$O$_3$ | 85 parts |
| (average particle size: 0.15 µm, $S_{BET}$: 52 m$^2$/g, surface treatment with Al$_2$O$_3$, SiO$_2$, pH: 6.5 to 8.0) | |
| Carbon black (average particle size: 40 nm) | 15 parts | were pulverized in an open kneader for 10 minutes, then the compound obtained by adding sodium hydroxyethyl sulfonate (SO$_3$Na: 6 × 10$^{-5}$ eq/g, epoxy: 10$^{-3}$ eq/g, Mw: 30,000) to the copolymer of

| | |
|---|---|
| Polyurethane resin A | 10 parts (solid content) |
| Vinyl chloride resin | 1.7 parts |
| (vinyl chloride/vinyl acetate/ | |
| glycidyl methacrylate = 86/9/5) | |
| and | |
| Cyclohexanone | 60 parts | were added to the above reaction system, kneaded for 60 minutes, and then

| | |
|---|---|
| Methyl ethyl ketone/cyclohexanone = 6/4 | 200 parts | was added and dispersed in a sand mill for 120 minutes. Thereto were added

| | |
|---|---|
| 2-Ethylhexyl stearate | 0.5 parts |
| Stearic acid | 1.2 parts |
| Stearic acid amide | 0.3 parts |
| Methyl ethyl ketone | 50 parts | followed by stirring and mixing for further 20 minutes, and the mixture was filtered through a filter having an average pore diameter of 1 µm, thereby a coating solution for the lower layer was obtained.

As an adhesive layer, a sulfonic acid-containing polyester resin was coated in dry thickness of 0.1 µm using a coil bar on the surface of an aramide support having a thickness of 4 µm.

Subsequently, the above-obtained lower layer coating solution was coated in a thickness of 1.0 µm, and immediately after that the upper magnetic layer coating solution was coated on the lower layer in dry thickness of 0.1 µm using a reverse roll by multilayer coating. While the magnetic coating solution was still wet, the nonmagnetic support coated with the magnetic coating solution was subjected to magnetic field orientation with a 0.5 T (tesla) Co magnet and a 0.5 T solenoid magnet, then to calendering treatment (velocity: 100 m/min, line pressure: 300 kg/cm (line pressure: 2,840 N/cm), temperature: 90° C.) by the combination of metal roll-metal roll-metal roll-metal roll-metal roll-metal roll-metal roll, and cut to a width of 8 mm.

Examples 2 to 8 and Comparative Examples 1 to 5

Samples were prepared in the same manner as in Example 1 except that the kinds of polyurethane resins, the addition amounts of ester-based lubricant (2-ethylhexyl stearate), and the dry coating thicknesses of the magnetic layer were changed as shown in Table 2.

Each sample was measured and evaluated as follows. The results obtained are shown in Table 3 below.

Measuring Methods (1) C/Fe peak ratio: as described above.
(2) Long term storage stability: the tape was stored at 60° C., 90% RH for 8 weeks, and the surface of the magnetic layer was observed with a differential interference microscope of 200-fold.

X: Minute crystals were generated.
Δ: Crystals were not generated but discolored.
○: No change was observed.

(3) Output: recording was performed on the sample tape using a drum tester (manufactured by Koyo Seisakusho Co.) on the conditions of recording wavelength: 0.5 μm, a head velocity: 10 m/sec, and the recording was reproduced. The reproduction output of each sample tape was evaluated relatively taking the reproduction output of the tape in Comparative Sample 3 as 100%.

TABLE 3

| | Magnetic Layer | | | Nonmagnetic Layer | | | | |
|---|---|---|---|---|---|---|---|---|
| Example No. | Polyurethane Resin Kind | Ester-Based Lubricant (parts) | Thickness (μm) | Polyurethane Resin Kind | Ester-Based Lubricant (parts) | C/Fe Peak Ratio | Long Term Storage Stability | Output (%) |
| Example 1 | A | 0.5 | 0.2 | A | 0.5 | 10 | ○ | 110 |
| Example 2 | A | 0.7 | 0.2 | A | 0.7 | 11 | ○ | 110 |
| Example 3 | A | 0.4 | 0.2 | A | 0.4 | 9 | ○ | 106 |
| Example 4 | A | 0.3 | 0.2 | A | 0.3 | 7 | ○ | 105 |
| Comparative Example 1 | A | 0.2 | 0.2 | A | 0.2 | 6 | x | 107 |
| Comparative Example 2 | A | 1.0 | 0.2 | A | 1.0 | 13 | x | 109 |
| Example 5 | B | 0.5 | 0.2 | B | 0.5 | 10 | ○ | 110 |
| Example 6 | C | 0.5 | 0.2 | C | 0.5 | 10 | ○ | 110 |
| Comparative Example 3 | D | 0.5 | 0.2 | D | 0.5 | 10 | Δ | 100 |
| Comparative Example 4 | E | 0.5 | 0.2 | E | 0.5 | 10 | Δ | 98 |
| Example 7 | A | 0.5 | 0.1 | A | 0.5 | 7 | ○ | 108 |
| Example 8 | A | 0.5 | 0.3 | A | 0.5 | 11 | ○ | 107 |
| Comparative Example 5 | A | 0.5 | 0.5 | A | 0.5 | 13 | x | 105 |

It can be seen from the above Table that in Comparative Examples 1, 2 and 5 wherein the polyurethane resin according to the present invention were used but C/Fe peak ratio was outside the range of the present invention, the reproduction output was the same degree with the inventive examples but inferior in the long term storage stability. Further, in Comparative Examples 3 and 4 wherein polyurethane resins being not the polyurethane resin according to the present invention were used but C/Fe peak ratio was in the range of the present invention, both of the reproduction output and the long term storage stability were inferior to those in the inventive examples.

Effect of the Invention

The magnetic recording medium containing the polyurethane resin according to the present invention has the following effects.

(1) Electromagnetic characteristics are improved.
(2) Long term storage stability is improved.
(3) Since the generation of hydrochloric acid can be suppressed, the corrosion of the head can be improved.
(4) Since the use of vinyl chloride resins can be restrained, a magnetic recording medium which is useful for the environmental protection can be provided.

The entitle disclosure of each and every foreign patent application from which the benefit of foreign priority has been claimed in the present application is incorporated herein by reference, as if fully set forth herein.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a support having thereon a lower layer containing a nonmagnetic powder or a ferromagnetic powder dispersed in a binder, and at least a magnetic layer containing a ferromagnetic powder dispersed in a binder provided on the lower layer, wherein the binder contains a polyurethane resin obtained from a polyester polyol, a chain extending agent and an organic diisocyanate, and the magnetic layer surface has a C/Fe peak ratio of from 7 to 11 when measured by the Auger electron spectroscopy, wherein the polyurethane is at least one of (1) a polyurethane wherein the dibasic acid in the polyester polyol comprises an aliphatic dibasic acid, and 70 mol % or more of the diol component comprises a diol having alkyl branched side chain having 2 or more carbon atoms and not having a cyclic structure, and (2) a polyurethane wherein the dibasic acid in the polyester polyol comprises an aliphatic dibasic acid, 70 mol % or more of the diol component comprises an alkyl branched aliphatic diol having 2 or more of the total carbon atoms of branched side chain in one molecule, and the chain extending agent comprises an alkyl branched aliphatic diol having 3 or more of the total branched side chain carbon atoms in one molecule.

wherein the magnetic layer and/or the lower layer contain(s) an ester-based lubricant, and wherein the ester-based lubricant has a melting point of 10° C. or less.

2. The magnetic recording medium as in claim 1, wherein the magnetic layer has a thickness of from 0.1 to 0.5 μm.

3. The magnetic recording medium as in claim 1, wherein the magnetic layer has a thickness of from 0.1 to 0.3 μm.

* * * * *